United States Patent

Zadrozny et al.

[11] Patent Number: 5,937,385
[45] Date of Patent: Aug. 10, 1999

[54] METHOD AND APPARATUS FOR CREATING SPEECH RECOGNITION GRAMMARS CONSTRAINED BY COUNTER EXAMPLES

[75] Inventors: Wlodek Wlodzimierz Zadrozny, Tarrytown; Nandakishore Kambhatla, Yonkers, both of N.Y.

[73] Assignee: International Business Machines Corporation, Armonk, N.Y.

[21] Appl. No.: 08/954,761

[22] Filed: Oct. 20, 1997

[51] Int. Cl.[6] .................................. G10L 5/06; G10L 9/00
[52] U.S. Cl. ........................ 704/257; 704/255; 704/251
[58] Field of Search ................................ 704/257, 255, 704/251

[56] References Cited

U.S. PATENT DOCUMENTS 5,086,472  2/1992  Yoshida .................................... 704/257
5,642,519  6/1997  Martin ..................................... 704/257

OTHER PUBLICATIONS

Peter Grunwald, A Minimum Description Length Approach to Grammar Interference, pp. 201–216.
Michael Koerner, et al. "Speech Recognition the Future Nnow!" ISBN 0–13–618190–2, IBM Technical Support Center, Austin, Texas 78758.
Wlodek Zadrozny, "Minimum Description Length and Compositionality", IBM Research Report, RC20641 (91365) Nov. 25, 1996, pp.1–12.

*Primary Examiner*—David R. Hudspeth
*Assistant Examiner*—Robert Louis Sax
*Attorney, Agent, or Firm*—Louis J. Percello; Whitham, Curtis & Whitham

[57] ABSTRACT

An automated system generates and revises grammars for speech recognizers in a speech recognition system. Given an initial grammar, expressed in terms of non-terminals in Backus-Naur Form (BNF) notation, a sentence generator generates a list of all sentences accepted by the grammar. From this list, a corpus of inappropriate or irrelevant sentences which are accepted by the grammar (counter-examples) is identified. A grammar revisor program uses the original grammar and the list of counter examples, to generate a pruned list from which a revised grammar is generated. The revision process is iterated several times either concatenating or merging pairs of non-terminals until the revised grammar is deemed satisfactory in that it accepts as legal only relevant sentences. The revised grammar is used by the speech recognizer, thus reducing errors in the overall system.

18 Claims, 10 Drawing Sheets

```
<<START>> ::= <V> <PP> .
<V> ::= "MOVE" .
<PP> ::= "TO" <N> .
<N> ::= "OPERATOR".
```

TRANSFER MONEY TO CHECKING.
TRANSFER MONEY TO SAVINGS.
TRANSFER TO OPERATOR.
MOVE MONEY TO OPERATOR. —— 520
MOVE TO OPERATOR.
MOVE MONEY TO SAVINGS.
TRANSFER CHECKING TO OPERATOR

```
<<START>> ::= <N0> <N1> <N2> <N7>
            | <N5> <N2> <N6>
            | <N5> <N1> <N2> <N7>

<N0> ::= "MOVE" .
<N1> ::= "MONEY" .
<N2> ::= "TO" .
<N3> ::= "CHECKING" .
<N4> ::= "SAVINGS" .
<N5> ::= "TRANSFER" .
<N6> ::= "OPERATOR" .
<N7> ::= <N3> | <N4> .
```

| NON-TERMINALS | | CONCAT | MERGE |
|---|---|---|---|
| <N0> | <N1> | 48 SYMBOLS | 51 SYMBOLS |
| <N0> | <N2> | 50 SYMBOLS | 51 SYMBOLS |
| ... | ... | ... | ... |
| <N1> | <N2> | 46 SYMBOLS | 51 SYMBOLS |
| ... | ... | ... | ... |
| <N3> | <N4> | 50 SYMBOLS | 41 SYMBOLS |
| ... | ... | ... | ... |
| <N6> | <N5> | 50 SYMBOLS | 51 SYMBOLS |

```
660
<<START>> ::= <V> <N> <PP>
            | <V'> <PPo>
            | <Vo> <PP'>
            | <V'> <PP'> .
<PP> ::= "TO" <N> .
<PP'> ::= "TO" <N'> .
<PPo> ::= "TO" <No> .
<V> ::= "MOVE" | "TRANSFER" .
<V'> ::= "TRANSFER" .
<Vo> ::= "MOVE" .
<N> ::= "CHECKING" | "SAVINGS" | "MONEY" | "OPERATOR" .
<N'> ::= "CHECKING" | "SAVINGS" | "MONEY" .
<No> ::= "OPERATOR" .
```

FIG.11C

METHOD AND APPARATUS FOR CREATING SPEECH RECOGNITION GRAMMARS CONSTRAINED BY COUNTER EXAMPLES

BACKGROUND OF THE INVENTION

1. Field of the Invention

The present invention generally relates to speech recognition systems and, more particulary, to a system for creating grammars for speech recognition that are constrained by counter-examples.

2. Description of the Related Art

Figure 1A:
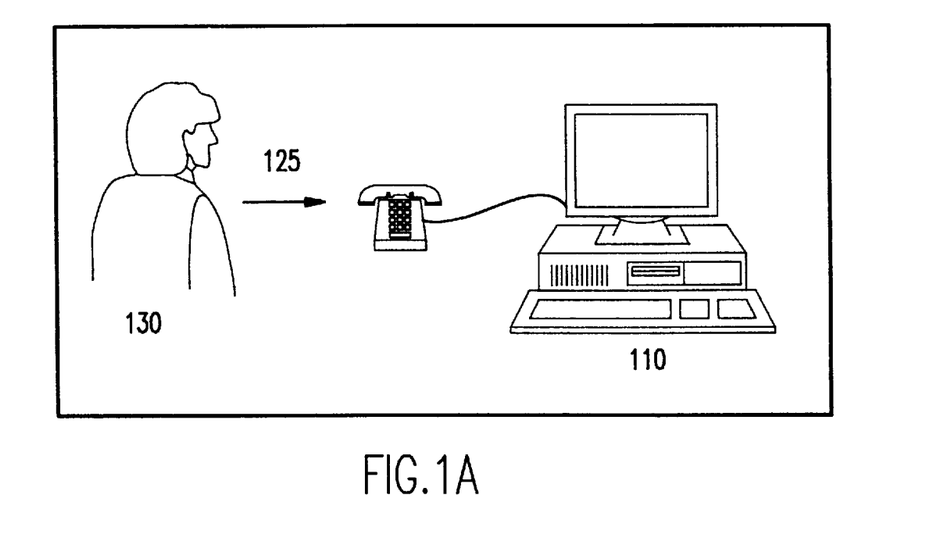
FIG. 1A is diagram showing a generalized speech recognition scenario with a human user.

Computer speech recognition systems, such as the one shown in FIG. 1A, recognize and process spoken commands and requests for information by human users. Typically, a user 130 will speak into a telephone 125 or other microphone connected to a speech recognition system 110 implemented, for example, on a computer. Speech recognition systems are typically used for specific applications, limited to a defined grammar universe. For example, a telephone banking application might recognize spoken requests by users to access information about their accounts. Such systems typically operate by recognizing individual words in an utterance, combining the words into a sentence based on a grammar, and then use a separate natural language processing module to infer the meaning of the sentence.

Figure 1B:
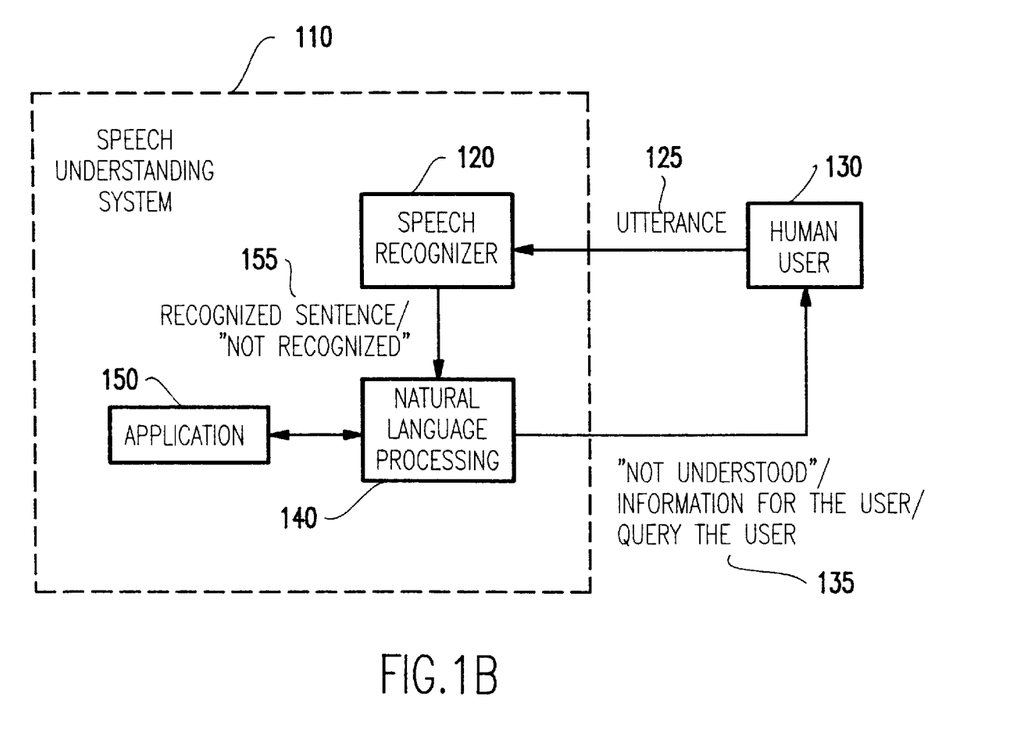
FIG. 1B is a schematic block diagram of the basic components of a speech recognition system.

Referring to FIG. 1B, in a typical speech recognition system 110, speech utterances 125 spoken by a human user 130 into a telephone microphone are fed into a speech recognizer 120. The speech recognizer 120 processes the utterance, and sends either a recognized sentence or a "not recognized" message 155 to the natural language processing (NLP) 140 module. The NLP module 140 determines the action to be taken and after accessing appropriate information from a local or remote application 150, feeds the information back to the user, sends a "not understood" message 135 to the user, or queries the user 130 for more information if the user's query or command is ambiguous. For a discussion of the current state of the art speech understanding and recognition systems, the reader is referred to Michael Koerner et al., Speech Recognition The Future Now!, Prentice Hall PTR, 1996, herein incorporated by reference.

Figure 2:
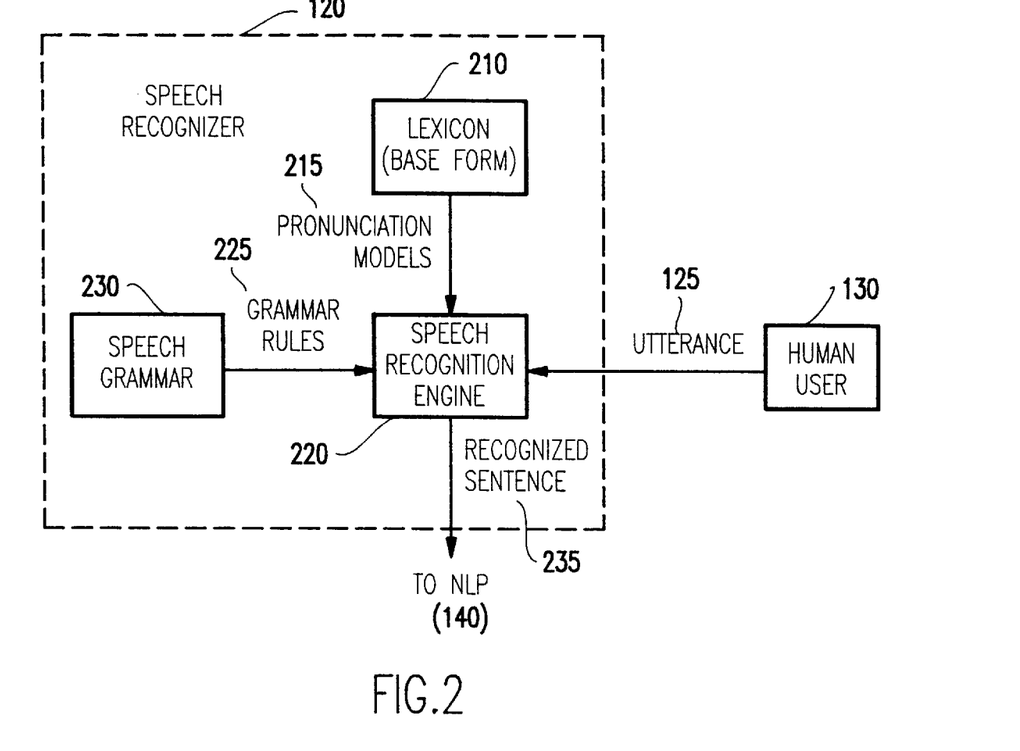
FIG. 2 is a schematic block diagram of the components of a speech recognizer as shown in FIG. 1B.

FIG. 2 is a schematic block diagram of the speech recognizer module 120 shown in FIG. 1B. A recognition engine 220 processes an utterance 125 using a lexicon 210 comprising base form pronunciations models 215 of all relevant words or phrases for a given domain of discourse. A speech grammar 230 specifies all valid sentences for the same domain. Typically, the words in an utterance are recognized first, and the recognized words are put together into a sentence based on the grammar rules 225 of a speech grammar 230. The speech recognition engine 220 sends the recognized sentence 235 or a "not recognized" message (in case no valid sentence is recognized) to the NLP module 140.

A speech grammar 230 is a set of rules 225 describing the different ways in which words can be put together to form a sentence 510 of a language. Speech recognizers 120 use a grammar 230 to constrain the number of different sentences 510 that an utterance 125 might be recognized as. For instance, a telephone banking application might use a specialized grammar for the speech recognizer in an effort to reduce system complexity by only recognizing sentences about banking. If the grammar accepts a large number of sentences, then the likelihood of recognizing uttered sentences as random, irrelevant, or undesirable, is increased. This is because speech recognizers are error prone at the word recognition stage, and rely on a grammar to constrain the number of possible sentences.

Figure 3:
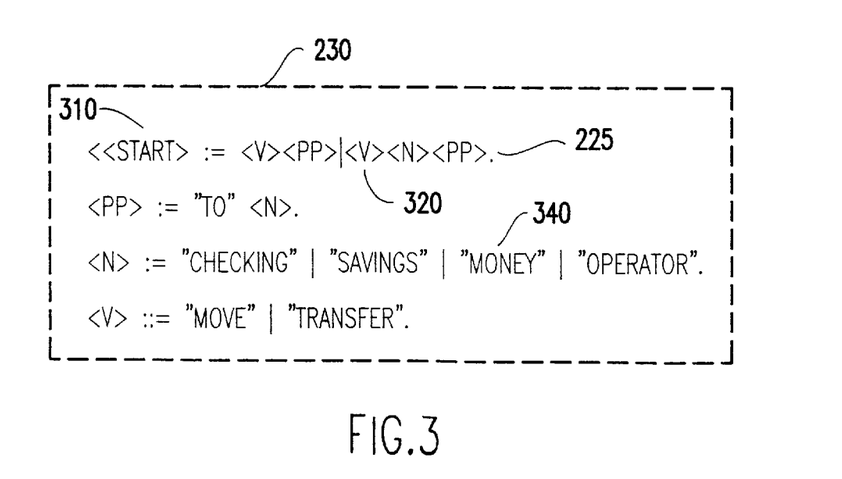
FIG. 3 is an example of a speech grammar for a telephone banking system.

FIG. 3 shows a simple speech recognition grammar 230 in Backus-Naur Form (BNF) notation. The symbols enclosed in the angular brackets are called non-terminals 320 and the symbols enclosed in quotes are called terminals 340. Thus, for this grammar, the non-terminals are START, N, V and PP, and the terminals are the words "money", "checking", "savings", "operator", "move", "transfer" and "to". Each non-terminal is defined in terms of other non-terminals or terminals using one or more production rules 225. A production rule comprises a non-terminal followed by the "::=" symbol followed by one or more terminals or non-terminals or "|" symbols (denoting a logical OR) followed by a period. The non-terminal enclosed in two angular brackets, <<START>>, denotes the start symbol 310 for the grammar. The set of sentences accepted by the grammar is defined by the set of sentences 510 which can be generated from the START symbol. The grammar in FIG. 3 accepts all sentences which comprise a verb followed by a prepositional phrase or a verb followed by a noun followed by a prepositional phrase, where a verb is "move" or "transfer", a noun is "checking" or "savings" or "operator" or "money", and a prepositional phrase is "to" followed by a noun.

Figure 4:
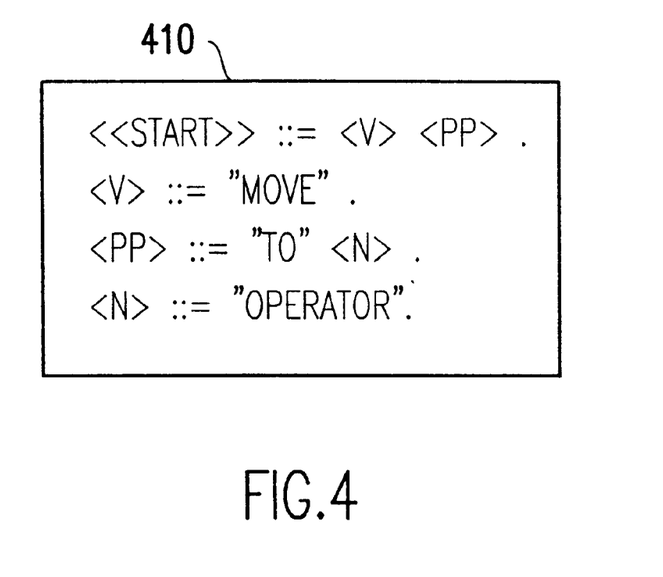
FIG. 4 is an example of a parse tree for the speech grammar shown in FIG. 3.

FIG. 4 shows a parse-tree 410 for a sentence accepted by the grammar in FIG. 3. The sentence "move to operator" is accepted by the grammar since by applying the production rules 225:

<<START>> ::= <V> <PP>, where

<V> ::= "move",

<PP> ::= "to" " <N>, and

<N> ::= "operator" , in succession, the same sentence can be generated. Thus, the parse-tree of a sentence is a representation of the production rules of the grammar which were applied successively to generate a sentence.

Generating grammars for speech is a tedious and difficult process. Typically, the grammars overgeneralize and accept too many sentences which are irrelevant or undesirable for a given application. The problem is usually handled by going through several revisions manually, in an effort to minimize the number of irrelevant sentences accepted by the grammar.

Figure 5:
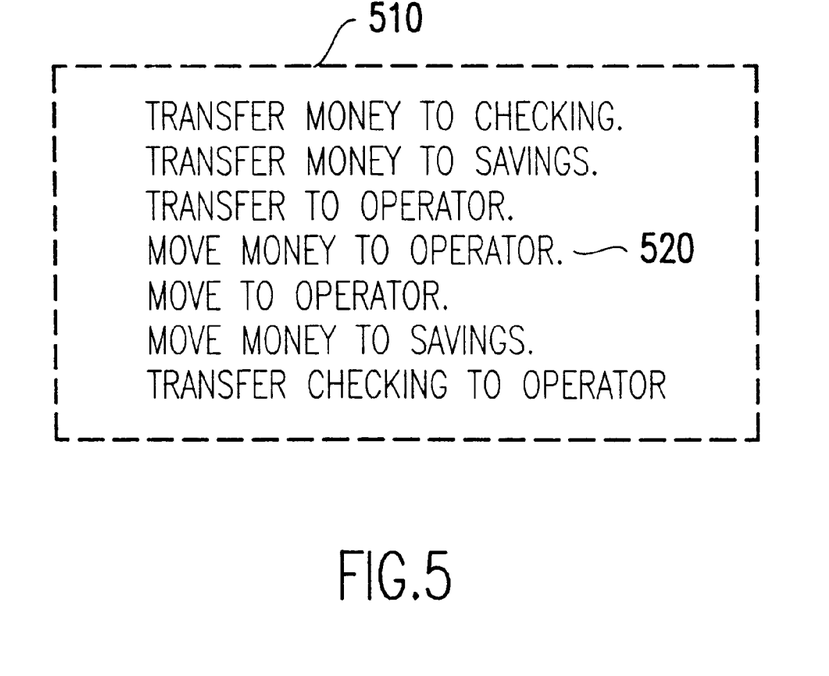
FIG. 5 is a list of different sentences that are legal within the rules of a grammar for the exemplary banking system, including irrelevant sentences.

FIG. 5 shows a few sentences 510 accepted by the grammar 230 in FIG. 3. Note that not all the accepted sentences are appropriate for a given application 150. For example, for a telephone banking application, it may be desired to disallow the sentence "move money to operator" or the sentence "move to operator". These sentences are called "counter-examples" 520. Thus, the grammar in FIG. 3 overgeneralizes for a telephone banking application, accepting more sentences than intended.

As mentioned previously, speech recognizers are error prone at the word recognition level, resulting in a greater chance of misinterpreting an utterance if the speech recognition grammar does not constrain the number of possibilities. Some of the best speech recognition systems are 90% accurate at recognizing words. This level of accuracy may be adequate for text dictation systems, but is unacceptable for transaction systems such as a telephone banking system where a misinterpreted word in a sentence can lead to a wrong transaction being processed. For such applications, an effective constraining grammar can reduce errors in the overall system by limiting the number of possible errors at the sentence level of the speech recognizer.

Typically, speech recognition grammars are hand built. This is a laborious and difficult task. The grammars usually overgeneralize, accepting more sentences than intended. The whole process is tedious and time consuming.

SUMMARY OF THE INVENTION

It is therefore an object of the present invention to provide a system for creating and revising grammars for speech recognition.

It is yet another object of the present invention to provide a system for creating and revising grammars for speech recognition using a corpus of counter examples which are sentences recognized by current grammar but irrelevant to a particular application.

The invention is directed to an automated system for generating and revising grammars for speech recognizers in a speech recognition system. Given an initial grammar, a sentence generator generates a list of all sentences accepted by the grammar. From this list, a corpus of inappropriate or irrelevant sentences which are accepted by the grammar (counter examples) is identified automatically or in an interactive process with an application developer. A grammar revisor program uses the original grammar and the list of counter examples, to generate a revised grammar. The revision process is iterated several times until the revised grammar is deemed satisfactory in that it accepts as legal only relevant sentences. The revised grammar is used by the speech recognizer, thus reducing errors in the overall system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 6:
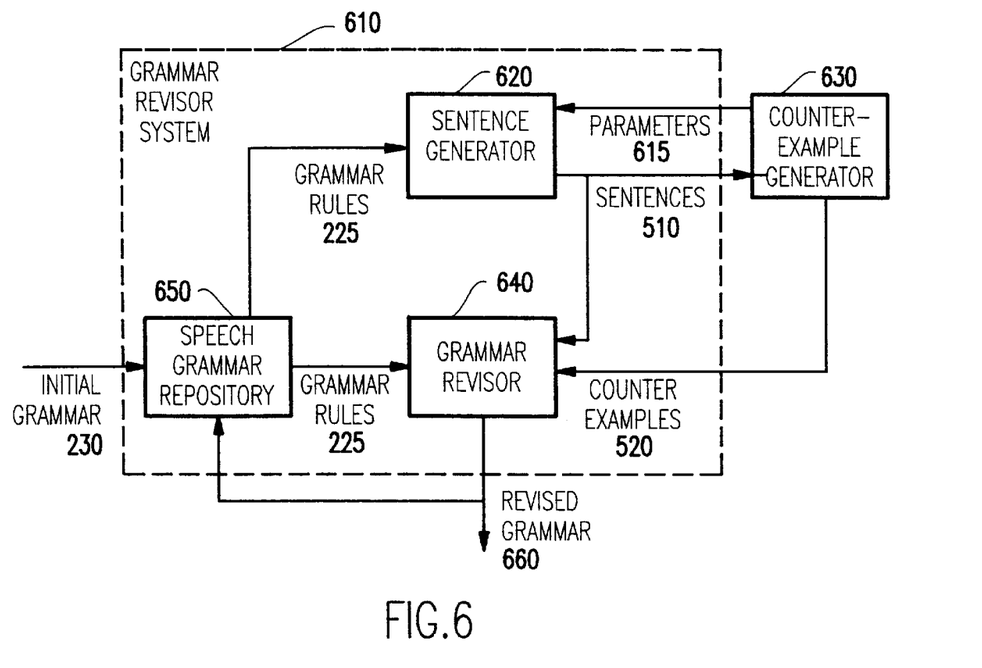
FIG. 6 is a schematic block diagram of an iterative grammar revisor system according the present invention which modifies speech grammars using a corpus of counter examples identified by a counter-example generator.

Referring now to the drawings, and more particularly to FIG. 6, there is shown a schematic block diagram of an iterative grammar revisor system 610 according to the present invention. A speech grammar repository 650 initially contains the original grammar 230. A sentence generator 620 enumerates sentences 510 accepted by the current grammar based on the parameters 615 input to it (for example, number of sentences to generate, the number of words in the generated sentences etc.). A counter-example generator 630 feeds parameter values into the sentence generator and identifies counter examples 520 (i.e., sentences irrelevant to a particular application) from among the sentences 510 generated by the sentence generator. A counter-example generator can be a computer program and may interact with a human user to determine counter-examples. The counter-examples 520 generated by the counter-example generator are fed into the grammar revisor module 640, which modifies the original grammar, so that the it no longer accepts the counter-examples. The revised grammar 230 can be fed back into the speech grammar repository 650 and whole process can be iterated several times until the grammar output by the grammar revisor is deemed satisfactory. The revised grammar 660 is used by the speech recognizer module 120 of FIGS. 1B and 2 instead of the original grammar 230, thus improving the overall performance of the speech understanding system 110.

Figure 7:
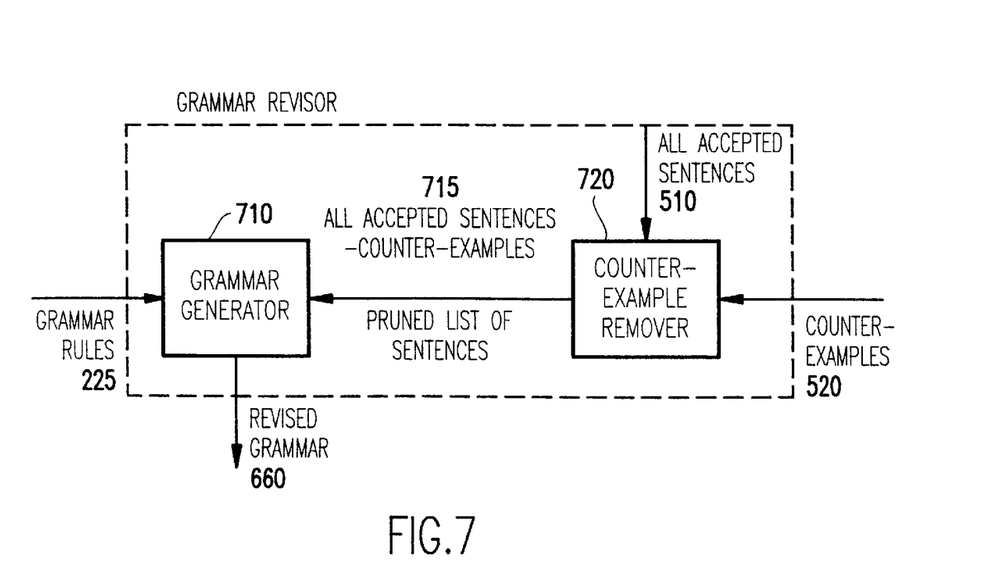
FIG. 7 is a schematic diagram of a first embodiment of a grammar revisor shown in FIG. 6.

FIG. 7 shows a first embodiment of the grammar revisor module 640 in the iterative grammar revisor system 610 as shown in FIG. 6. In this embodiment, the sentence generator 620 generates all accepted sentences 510 of the initial grammar 230, and a counter-example remover 720 deletes the counter-examples 520 from this list to generate a pruned list of accepted sentences 715. The pruned list 715 is used by a grammar generator 710 to create a revised grammar 660.

Figure 8:
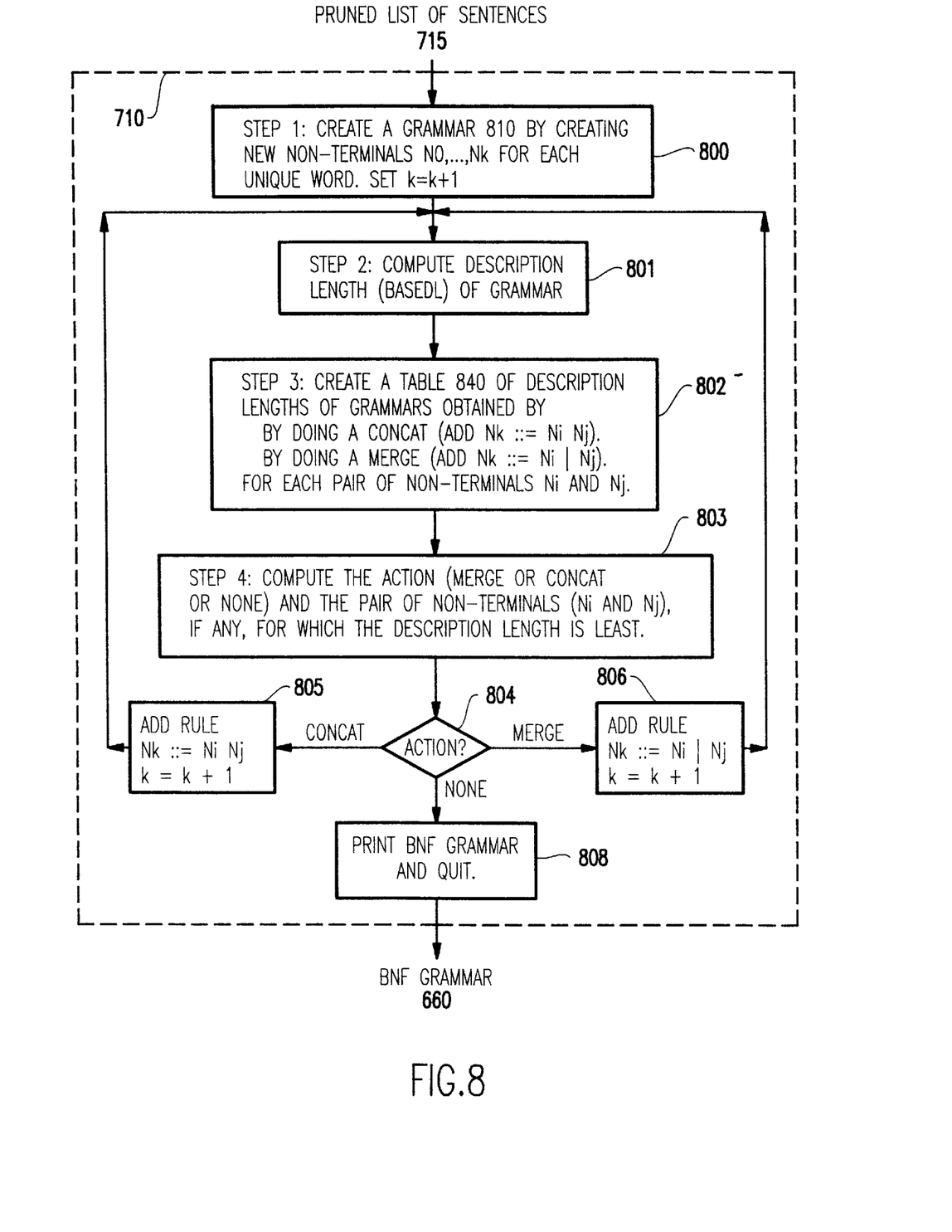
FIG. 8 is a flow diagram for a first embodiment of the grammar generator shown in FIG. 7 which uses a minimum description length (MDL) criterion to generate a compact grammar.
Figure 9A:
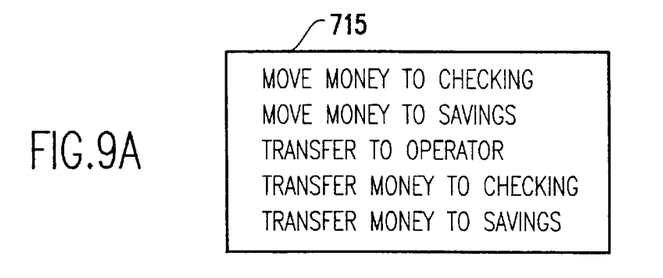
FIG. 9A is a pruned list of accepted or legal sentences.

FIG. 8 shows a flowchart for an embodiment of a grammar generator 710. The input to the grammar generator is a pruned list of sentences 715 and the output is a grammar 660 which accepts only those sentences from the pruned list. FIG. 9A shows an example of a pruned list of sentences 715 for the grammar 230 shown in FIG. 3. The pruned list was obtained by eliminating counter-examples identified by a counter-example generator from a list of all sentences accepted by the grammar. Hence, in this example, the pruned list contains only those sentences relevant to a banking application. The method in FIG. 8 proceeds as follows with reference to FIGS. 9A–9E.

Figure 9B:
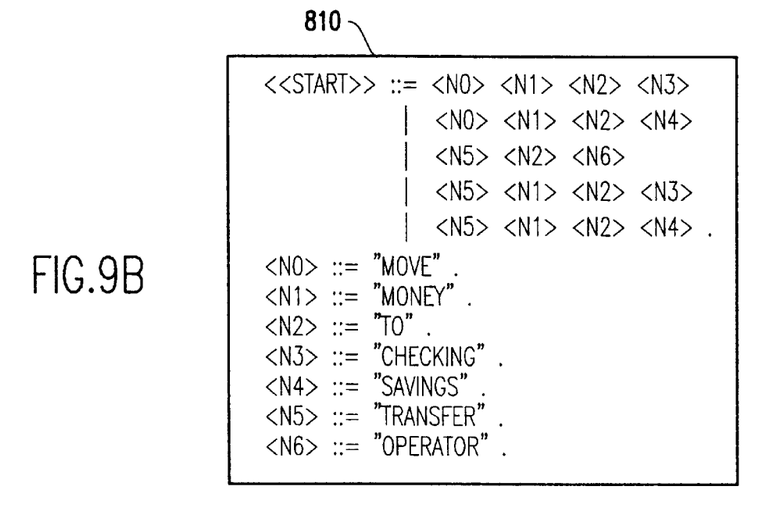
FIG. 9B is an initial grammar generated using the pruned list of sentences shown in FIG. 9A.

In step 1, block 800, an initial grammar 810 is created from scratch by creating a new non-terminal 320 for each unique word in the pruned list of sentences 715. FIG. 9B shows an example of an initial grammar 810 generated using the pruned list of sentences as shown in FIG. 9A. Note that new non-terminals have been created for each unique word in the pruned list. All of the rules of the grammar consist of only non-terminals represented by symbols. Thus, while processing the first sentence of the pruned list, "move money to checking", the rules:

<N0>::= "move";
<N1>::= "money";
<N2>::= "to"; and
<N3>::= "checking"

are added to the grammar, thus creating new non-terminals N0, N1, N2, and N3. Similar processing is done for all other sentences in the pruned list. Next, a rule going from the start symbol to all possible sentences expressed in terms of the newly created non-terminals is added. For the above example, the rule:

<<START>> ::= <N0> <N1> <N2> <3> is added. The resultant is an initial grammar 810 in Backus-Naur Form (BNF) which only accepts sentences from the pruned list 715 of sentence.

In step 2 at block 802, the grammar generator 710 computes the description length of the grammar. The description length of a grammar can be defined as the total number of symbols needed to specify the grammar. For example, a non-terminal is considered to be one symbol. Thus, <N0> and <N6> count as one symbol each as does "<<START>>". The symbols "::=" and "|" are also counted as one symbol each. Thus the initial grammar 810 shown in FIG. 9B contains forty-six (46) total symbols. This is the total number of symbols required to give a complete description of the grammar in BNF. Thus, the base description length (BASEDL) of the initial grammar 810 shown in FIG. 9B is forty-six (46).

In step 3, block 802, the initial grammar 810 is modified by concatenating (CONCAT) or merging (MERGE) all possible pairs of non-terminals in the grammar, computing the description length of each such resultant grammar, and choosing the action and the pair of non-terminals which result in the least description length.

Figure 9C:
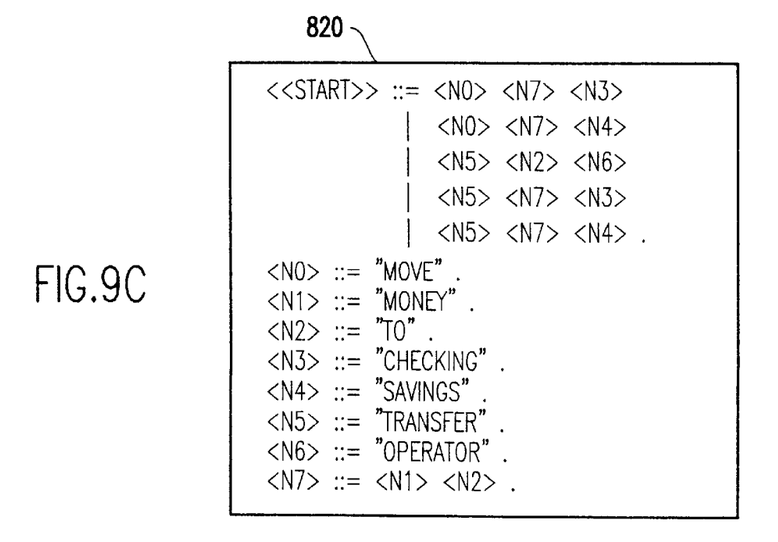
FIG. 9C is a modified grammar obtained from the initial grammar in FIG. 9B by concatenating (CONCAT) two non-terminals <N1> and <N2> and introducing a new rule: <N7>::= <N1> <N2>.

FIG. 9C shows an example of a modified grammar 820 obtained from the initial grammar 810 in FIG. 9B by concatenating (CONCAT) two non-terminals <N1> and <N2> and introducing a new rule:

<N7>::=<N1> <N2>.

All other rules are searched for consecutive occurrences of <N1> and <N2>, and replace with <N7>. Note that by counting the number of symbols in the grammar as described above, the description length is still forty-six (46) symbols.

Figure 9D:
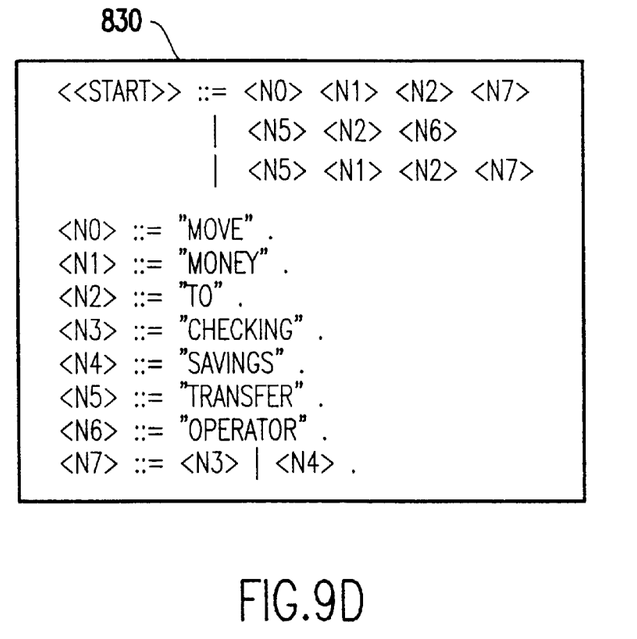
FIG. 9D is a modified grammar obtained from the initial grammar in FIG. 9B by merging (MERGE) two non-terminals <N3> and <N4> and introducing a new rule: <N7>::= <N3> | <N4>.

FIG. 9D shows an example of a modified grammar 830 obtained from the initial grammar 810 by merging (MERGE) two non-terminals <N3> and <N4>. In this case, a new rule:

<N7>::=<N3> | <N4> is introduced and a search for pairs of rules which differ only in position such that for one of the rules, the non-terminal <N3> occurs in that position and the other rule, the non-terminal <N4> occurs in the same position. The pair of rules is replaced from the grammar with a new rule which is exactly the same as either of the pairs of rules, except for the use of <N7> instead of <N3> or <N4>. For example, the rules:

<<START>>::= <N0> <N1> <N2><N3> and
<<START>>::= <N0> <N1> <N2><N4> from the initial grammar 810 differ only in the fourth position on the right hand side. Further, the fourth position is non-terminal <N3> in the first, and <N4> in the second. Hence, both rules can be replaced with the new rule:

<<START>>::= <N0> <N1> <N2> <N7> as shown in FIG. 9D. Note that the description length of the resultant grammar is only forty-one (41) symbols which is less then the original grammar of forty-six (46) symbols.

As mentioned above, in step 3 (block 802), a table is computed of description lengths 840 of the grammars obtained by concatenating or merging all possible pairs of non-terminals of the initial grammar 810.

Figure 9E:
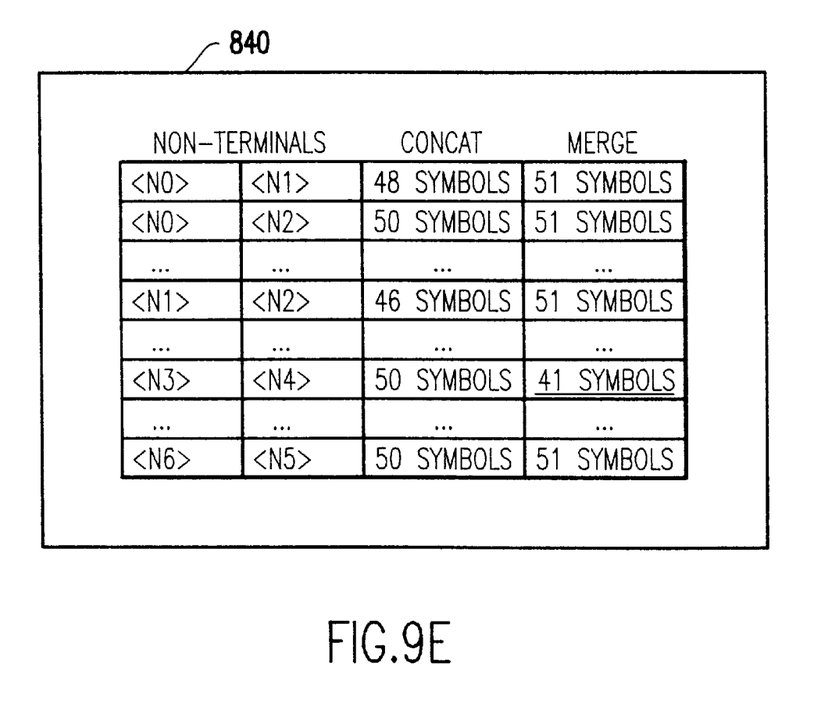
FIG. 9E is a chart showing the description lengths of the grammars obtained by concatenating or merging all possible pairs of non-terminals of the initial grammar shown in FIG. 9B.

FIG. 9E shows such a table of description lengths for the initial grammar 810 in FIG. 9B.

In action block 804, the pairs of non-terminals are either concatenated (block 805) or merged (block 806) according to the action resulting in the least description length. Thus, for example in FIG. 9E, the merging of <N3> and <N4> results in the grammar with the least description length (41 symbols). Thus, the grammar is modified as shown in FIG. 9D, and then the method loops back to STEP 2, block 801. Steps 2, 3, and 4 are iterated until the description length does not decrease. If the base description length of the grammar is lower than that resulting from merging or concatenating any pair of non-terminals, then the grammar is printed in BNF format. Thus, this method attempts to find the grammar with the least description length which accepts only the sentences in the pruned list.

In other embodiments of the grammar generator 710, different optimization criteria (other than description length) can be used to select the pairs of non-terminals to concatenate or merge. Thus, steps 2, 3, and 4 of FIG. 8 can be modified to use different criteria. For instance, the selection can be based on the syntactic categories of the corresponding terminals (e.g the words "operator" and "checking" are both nouns, therefore merge the corresponding non-terminals). Another embodiment might make the selection based on the semantic categories of the corresponding terminals (e.g the words "checking" and "savings" both refer to accounts, therefore, merge the corresponding non-terminals). Yet another embodiment might make the selection of non-terminals based on the frequency of occurrence of the non-terminals (e.g merge the two most frequently occurring non-terminals).

In other embodiments of the grammar generator 710, it is also possible to add additional actions for making the grammar more compact. For example, by making use of an optional "?" character (signifying two rules at once, one with the corresponding non-teriminal present, and the other rule with the non-terminal absent) in the grammar specification or by computing the optimization criterion (like description length) for merging or concatenating more than two non-terminals in one step.

Figure 10:
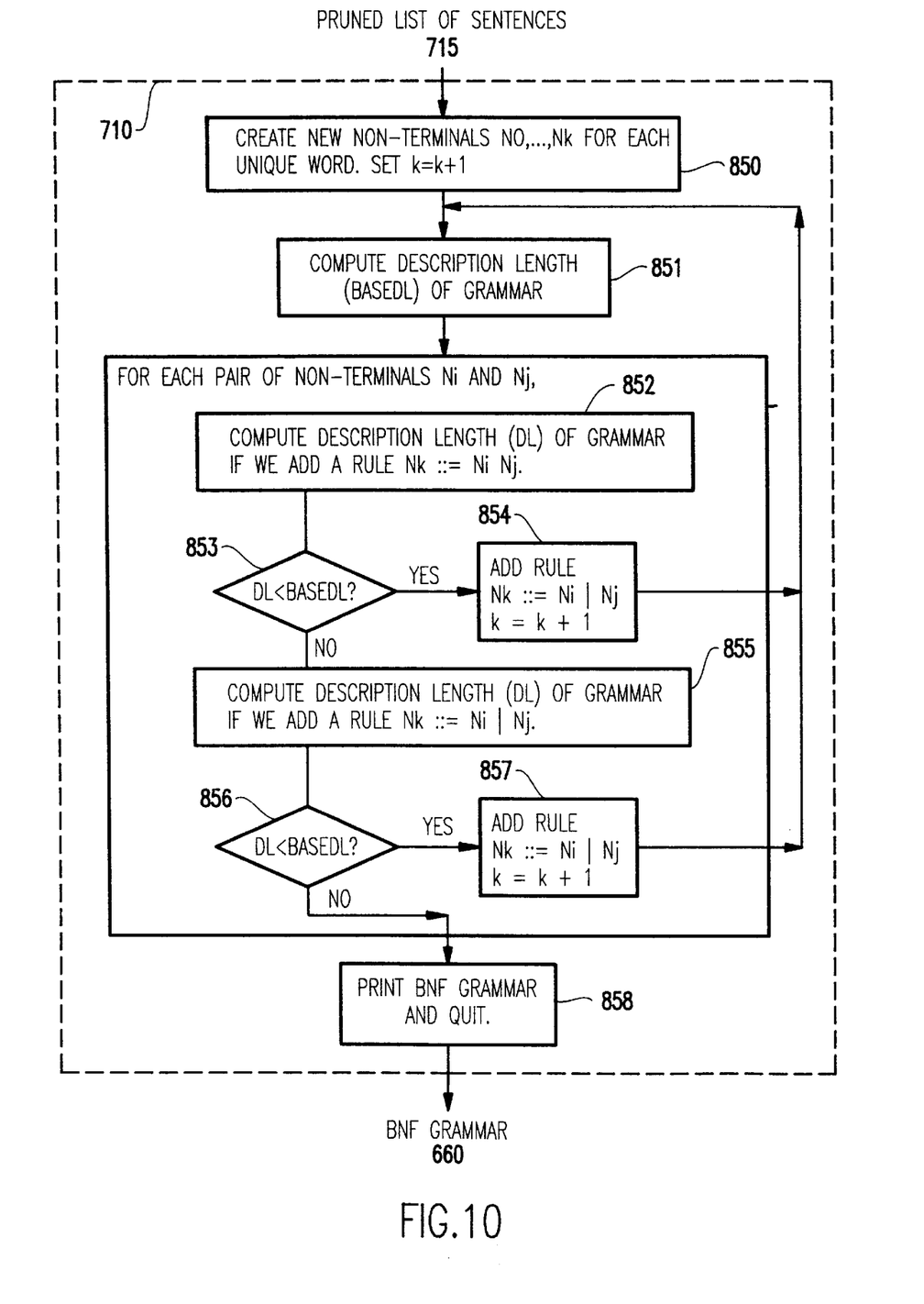
FIG. 10 is a flow diagram for the second embodiment of the grammar generator which uses a greedy algorithm to generate a compact grammar.

FIG. 10 shows a second embodiment of a grammar generator 710, which is a variation of the method described in FIG. 8. As before, an initial grammar is created by creating new non-terminals for each unique word, at block 850 and calculating the base description length of the grammar at block 851. Next, each pair of non-terminals are examined for possible actions (e.g MERGE, CONCATENATE), which will result in a lower description length. In block 852 a base description length is calculated for merging a pair of non-terminals. In decision block 853, if the new description length is less than the base description length, a new rule is added merging the non-terminal pair. If, on the other hand, the new description length is not less than the base description length, the description length of the concatenated non-terminal pair is calculated at block 855. In decision block 856 the concatenated description length is less than the base description length, then a new rule is added concatenating the non-terminal pair. In this embodiment, in each iteration, an action is executed as soon as it is determined that it will result in a lower description length than the base description length of the grammar from the previous iteration. Thus, this version of the algorithm may be considered a "greedy" algorithm. At each step, rather than computing the optimal action to execute in order to minimize the description length, an action is executed as soon as it is determined that it will result in a smaller description length than the current base description length.

Other embodiments of the grammar generator shown in FIG. 10 might use different optimization criteria (other than description length). For instance, non-terminals might be merged or concatenated based on their syntactic or semantic categories, or based on the frequency of their occurrence.

Figure 11A:
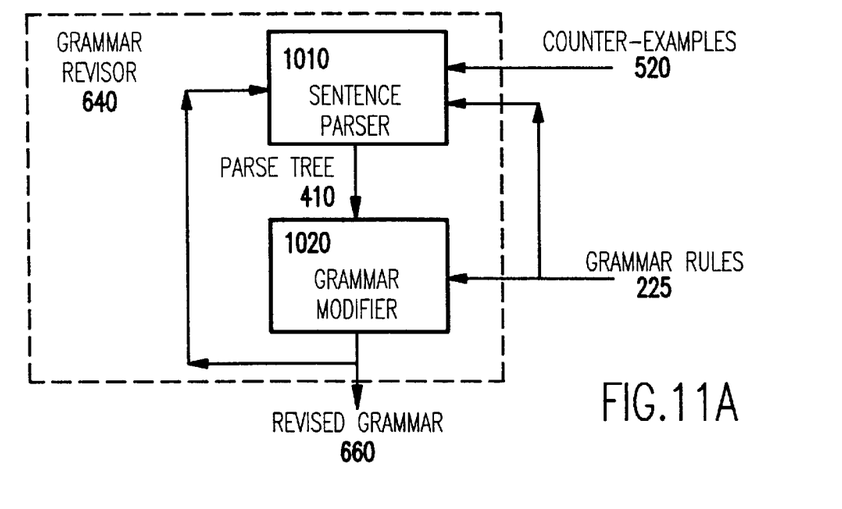
FIG. 11A is a schematic block diagram of a second embodiment of a grammar revisor of FIG. 6 where a sentence parser generates parse-trees of the counter-examples and a grammar modifier modifies the production rules of the original grammar.

Referring now to FIG. 11A there is shown a second embodiment of the grammar revisor module 640 in the iterative grammar revisor system 610. In this embodiment, grammar rules 225 of an initial grammar are used by a sentence parser 1010 to generate a parse-tree(s) 410 for a counter-example 520. Note that a parse-tree of a sentence is a representation of all the grammar rules needed to generate the sentence. The parse tree is used by a grammar modifier 1020 to modify the production rules of the grammar 225 and add new rules to it in such a way that the revised grammar 660 does not accept the given counter-example. The revised grammar is used by the sentence parser 1010 to generate a parse tree 410 for another counter-example 520 and the parse tree(s) is passed on to the grammar modifier 1020, which now modifies the revised grammar from the previous iteration.

This process is continued until there are no more counter-examples 520.

In the grammar revisor 640 (FIG. 11A), a parse tree for a counter-example is used by a grammar modifier 1020 to modify a grammar (an initial grammar in the first iteration and the revised grammar 660 from previous iterations otherwise), such that the revised grammar 660 does not accept the given counter-example.

Figure 11B:
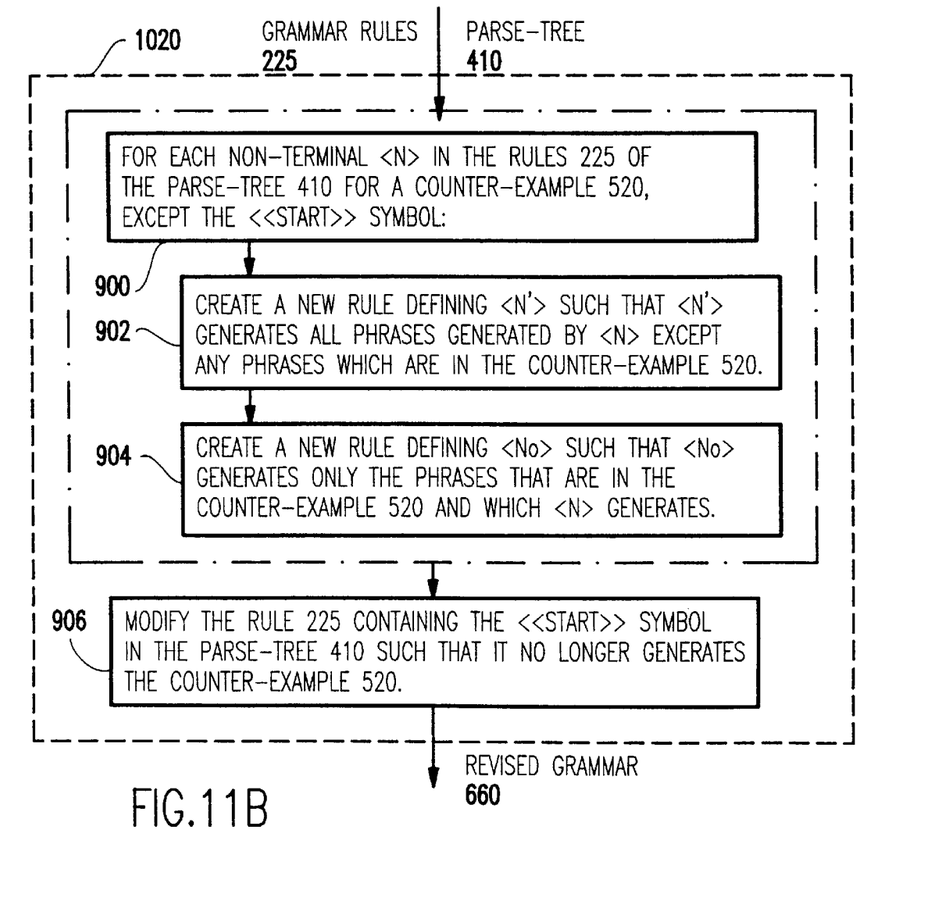
FIG. 11B is flow diagram for the grammar reviser shown in FIG. 11A.

FIG. 11B shows a flowchart of an embodiment of a grammar modifier 1020. First, in block 900, for each non-terminal <N> in the parse tree 410, except the <<START>> symbol, add a rule to define a new non-terminal <N'> such that <N'> generates all phrases that <N> generates except for the phrase in the counter-example 520 that <N> generates as shown in block 902. Thereafter, as shown in block 904, add a rule to define a new non-terminal <No> such that <No> generates only the phrase in the counter-example 520 that <N> generates. In block 906, modify the rule which contains the <<START>> symbol in the parse tree, such that the <<START>> symbol no longer generates the given counter-example.

Figure 11C:
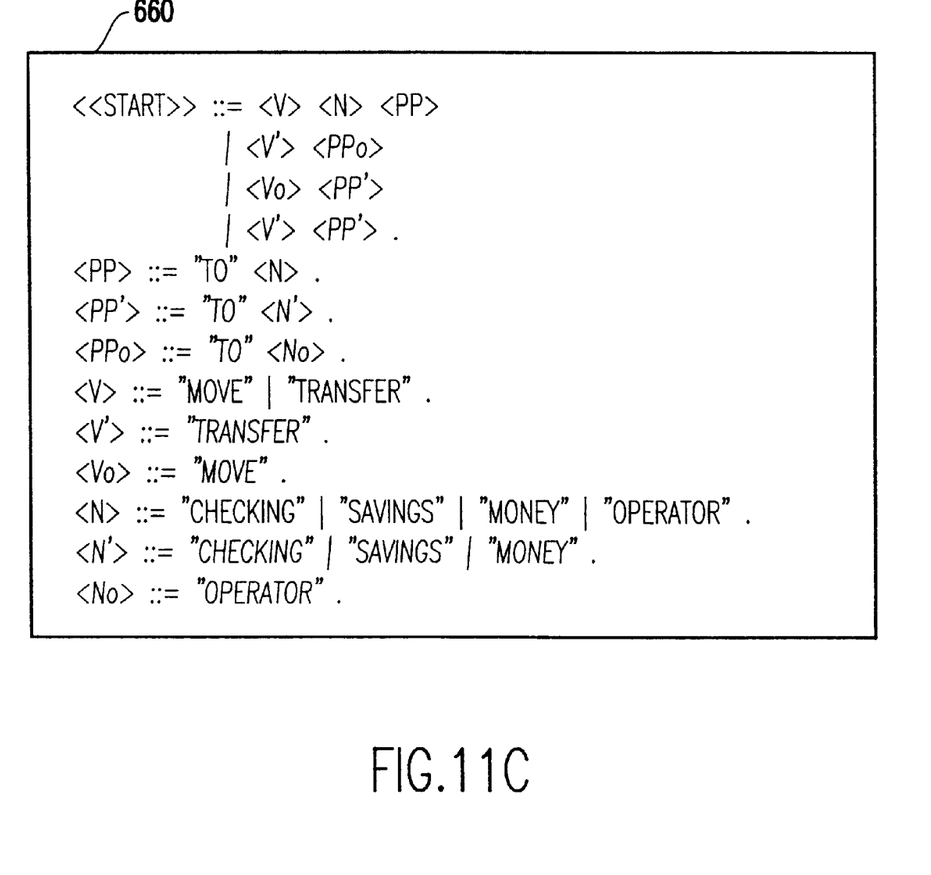
FIG. 11C is an example of a revised grammar as revised by the grammar revisor shown in FIG. 11A.

For example, FIG. 4 shows the parse-tree for a sentence "move to operator" which is accepted by the grammar in FIG. 3. suppose this sentence is selected as a counter-example for a particular application and it is desired to disallow this sentence from the grammar. FIG. 11C shows a revised grammar 660 generated by the grammar revisor 640 (FIG. 11A) using the algorithm described above. With the counter-example "move to operator", the grammar modifier works as follows. The parse tree contains the rule:

<V> ::="move".

which contains the non-terminal <V>. A rule is added to define a new non-terminal <V'> which does not generate "move" and a rule to define a new non-terminal <Vo> which generates only "move". Thus, add the rules:

<V'> ::="transfer"; and

<Vo> ::="move"

to the grammar. Similarly, since the parse tree contains the rule:

<N>::= "operator", new rules are added for:
<N'>::= "checking" | "savings" | "money"; and
<No>::= "operator"

to the grammar. The parse tree also contains the non-terminal <PP>. New rules are added for:

<PP'>::= "to" <N'>; and <PPo>::="to" <No>.

Note that since <No> only generates the phrase "operator" which is part of the counter-example, <PPo> only generates the phrase "to operator" which is part of the counter-example. Also, <PP'> generates all phrases that <PP> generates except for the phrase "to operator". Finally, the rule:

<<START>>::= <V> <PP> is modified using the newly created non-terminals <V'>, <Vo>, <PP'> and <PPo> such that the only sentences which are accepted by the grammar and begin with the phrase "move" do not end with the phrase "to operator", and also, the only sentences which are accepted by the grammar and end with the phrase "to operator" do not berlin with the phrase "move".

FIG. 11C shows the final modified grammar 660 (which is a modification of the grammar 230 in FIG. 3) such that the grammar accepts all sentences that the grammar in FIG. 3 accepts except for the Sentence "move to operator". In FIG. 11C, all the grammar rules that are new or modified are shown in bold and italics.

While the invention has been described in terms of a single preferred embodiment, those skilled in the art will recognize that the invention can be practiced with modification within the spirit and scope of the appended claims.

We claim:

1. A system for creating grammars for a speech recognition application, comprising:

speech grammar repository means for receiving an initial grammar for a speech recognition system and outputting a set of initial grammar rules for said initial grammar;

sentence generator means for generating a list of possible sentences according to said initial grammar rules;

counter-example generator means for analyzing said list of possible sentences and generating a list of counter example sentences comprising sentences which are legal within said initial grammar rules but which are inapplicable for said speech recognition application; and a grammar revisor means, receiving said initial grammar rules and said list of counter example sentences, for generating from said initial grammar rules and said list of counter example sentences a revised grammar, wherein said counter example sentences are illegal in said revised grammar.

2. A system for creating grammars for a speech recognition application as recited in claim 1 wherein said grammar revisor means comprises:

counter-example remover means for removing said counter example sentences from said list of possible sentences and outputting a pruned list; and a grammar generator means, receiving said pruned list and outputting said revised grammar.

3. A system for creating grammars for a speech recognition application, comprising:

speech grammar repository means for receiving an initial grammar for a speech recognition system and outputting a set of initial grammar rules for said initial grammar;

sentence generator means for generating a list of possible sentences according to said initial grammar rules;

counter-example generator for analyzing said list of possible sentences and generating a list of counter example sentences comprising sentences which are legal within said initial grammar rules but which are inapplicable for said speech recognition application; and a grammar revisor means, receiving said initial grammar rules and said list of counter example sentences, for generating therefrom a revised grammar wherein said counter example sentences are illegal for said speech recognition application, wherein said grammar revisor means comprises:

counter-example remover means for removing said counter-example sentences from said list of possible sentences and outputting a pruned list; and a grammar generator means, receiving said pruned list and outputting said revised grammar, wherein said counter example sentences are illegal for said speech recognition application, wherein said grammar generator means comprises:

means for generating a unique non-terminal for each word in said pruned list;

means for computing a base optimization criterion value based on properties of words in said pruned list for said initial grammar;

means for concatenating a pair of non-terminals and computing a first resultant optimization criterion value;

means for merging said pair of non-terminals and computing the second resultant value of said optimization criterion; and means for adding a new grammar rule to said initial grammar in accordance with an optimal of said first and second optimization criterion values.

4. A system for creating grammars for a speech recognition application as recited in claim 3 wherein said optimization criterion is description length of the grammar.

5. A system for creating grammars for a speech recognition application as recited in claim 4 wherein said initial grammar is expressed in Backus-Naur Form (BNF) notation.

6. A system for creating grammars for a speech recognition application, comprising:

speech grammar repository means for receiving an initial grammar for a speech recognition system and outputting a set of initial grammar rules for said initial grammar;

sentence generator means for generating a list of possible sentences according to said initial grammar rules;

counter-example generator for analyzing said list of possible sentences and generating a list of counter example sentences comprising sentences which are legal within said initial grammar rules but which are inapplicable for said speech recognition application; and a grammar revisor means, receiving said initial grammar rules and said list of counter example sentences, for generating therefrom a revised grammar wherein said counter example sentences are illegal for said speech recognition application, wherein said grammar revisor means comprises:

counter-example remover means for removing said counter-example sentences from said list of possible sentences and outputting a pruned list; and a grammar generator means, receiving said pruned list and outputting said revised grammar, wherein said counter example sentences are illegal for said speech recognition application, wherein said grammar generator means comprises:

means for generating a unique non-terminal for each word in said pruned list;

means for computing a base value of an optimization criterion based on properties of the words in said pruned list for said initial grammar;

means for concatenating a pair of said non-terminals and computing a resultant value of said optimization criterion and for adding a new rule for said concatenated pair to said initial grammar if said value of criterion is more optimal than said base value of said optimization criterion; and means for merging said pair of said non-terminals and computing a resultant value of said criterion and for adding a new rule for said merged pair to said initial grammar if said resultant value of optimization criterion is more optimal than said base value of criterion.

7. A system for creating grammars for a speech recognition application as recited in claim 6 wherein said criterion is description length of the grammar.

8. A system for creating grammars for a speech recognition application as recited in 7 wherein said initial grammar is expressed in Backus-Naur Form (BNF) notation.

9. A method for modifying grammars for a speech recognition application, comprising steps of:

creating an initial grammar for a speech recognition system and outputting a set of initial grammar rules for said initial grammar;

generating a list of possible sentences according to said initial grammar rules;

generating a list of counter-example sentences comprising sentences which are legal within said initial grammar rules but which are inapplicable for said speech recognition application; and generating from said initial grammar rules and said counter-example sentences a revised grammar wherein said counter example sentences are illegal.

10. A method for modifying grammars for a speech recognition application as recited in claim 9 further comprising steps of:

removing said counter-example sentences from said list of possible sentences and outputting a pruned list; and revising said initial grammar with said pruned list and outputting a revised grammar wherein said counter example sentences are illegal.

11. A method for modifying grammars for a speech recognition application comprising the steps:

creating an initial grammar for a speech recognition system and outputting a set of initial grammar rules for said initial grammar;

generating a list of possible sentences according to said initial grammar rules;

generating a list of counter-example sentences comprising sentences which are legal within said initial grammar rules but which are inapplicable for said speech recognition application;

generating from said initial grammar rules a revised grammar wherein said counter example sentences are illegal;

removing said counter-example sentences from said list of possible sentences and outputting a pruned list;

revising said initial grammar with said pruned list and outputting a revised grammar wherein said counter example sentences are illegal;

generating a unique non-terminal for each word in said pruned list;

computing the base value of an optimization criterion based on properties of the words in said pruned list for said initial grammar;

concatenating a pair of said non-terminals and computing a first resultant value of said optimization criterion;

merging said pair of non-terminals and computing a second resultant value of said optimization criterion; and adding a new grammar rule to said initial grammar in accordance with an optimal of said first and second resultant value.

12. A method for modifying grammars for a speech recognition application as recited in claim 11, wherein said optimization criterion is description length of the grammar.

13. A method for modifying grammars for a speech recognition application as recited in claim 12 further comprising the step of expressing said initial grammar in Backus-Naur Form (BNF) notation.

14. A method for modifying grammars for a speech recognition application comprising the steps of:

creating an initial grammar for a speech recognition system and outputting a set of initial grammar rules for said initial grammar;

generating a list of possible sentences according to said initial grammar rules;

generating a list of counter-example sentences comprising sentences which are legal within said initial grammar rules but which are inapplicable for said speech recognition application;

generating from said initial grammar rules a revised grammar wherein said counter example sentences are illegal;

removing said counter-example sentences from said list of possible sentences and outputting a pruned list;

revising said initial grammar with said pruned list and outputting a revised grammar wherein said counter example sentences are illegal;

generating a unique non-terminal for each word in said pruned list;

computing a base value of an optimization criterion based on properties of the words in said pruned list for said initial grammar;

concatenating a pair of said non-terminals and computing a resultant value of said criterion and adding a new rule for said concatenated pair to said initial grammar if said resultant value of optimization criterion is more optimal than said base value of optimization criterion; and merging said pair of said non-terminals and computing a resultant value of said optimization criterion and adding a new rule for said merged pair to said initial grammar if said resultant value of said optimization criterion is more optimal than said base value of optimization criterion.

15. A method for modifying grammars for a speech recognition application as recited in claim 14, wherein said criterion is description length of the grammar.

16. A method for modifying grammars for a speech recognition application as recited in claim 14 further comprising the step of expressing said initial grammar in Backus-Naur Form (BNF) notation.

17. A method for modifying grammars for a speech recognition application comprising the steps of:

creating an initial grammar for a speech recognition system and outputting a set of initial grammar rules for said initial grammar;

generating a list of possible sentences according to said initial grammar rules;

generating a list of counter-example sentences comprising sentences which are legal within said initial grammar rules but which are inapplicable for said speech recognition application;

generating from said initial grammar rules a revised grammar wherein said counter example sentences are illegal;

generating a parse tree comprising a plurality of non-terminals for each of said sentences in said list of counter-example sentences;

adding a new non-terminal for each non-terminal in said parse tree which generates each phrase that said non-terminal generates but excludes phrases in said list of counter-example sentences; and modifying a START non-terminal in said parse tree wherein said START non-terminal excludes sentences in said list of counter-example sentences.

18. A method for modifying grammars for a speech recognition application comprising the steps of:

creating an initial grammar for a speech recognition system and outputting a set of initial grammar rules for said initial grammar;

generating a list of possible sentences according to said initial grammar rules;

generating a list of counter-example sentences comprising sentences which are legal within said initial grammar rules but which are inapplicable for said speech recognition application;

generating from said initial grammar rules a revised grammar wherein said counter example sentences are illegal;

generating a parse tree comprising a plurality of non-terminals <N> for each of said sentences in said list of counter-example sentences;

for each non-terminal <N > in said parse tree except a <<Start>> symbol:

creating a new rule <N'> such that <N'> generates all phrases generated by <N> except any phrases which are in said list of counter-example sentences;

creating a new rule <No> such that <No> generates only phrases which are in said list of counter-example sentences and generated by <N>; and modifying a rule containing said <<START>> symbol in said parse tree such that said rule containing said <<START>> symbol ceases to generate said sentences in said list of counter-example sentences.

* * * * *